United States Patent [19]

Rousset et al.

[11] Patent Number: 4,765,921

[45] Date of Patent: Aug. 23, 1988

[54] ACID COMPOSITION WITH HIGH CONCENTRATIONS OF ACTIVE MATERIALS FOR THE TREATMENT OF WATER AND/OR CLEANING INSTALLATIONS CONTAINING SAME

[75] Inventors: Jacky Rousset, St Trivier-sur-Moignans; Jean Moro, Vaulx-en Velin, both of France

[73] Assignee: Coatex S.A., Caluire, France

[21] Appl. No.: 64,395

[22] Filed: Jun. 22, 1987

[30] Foreign Application Priority Data

Jul. 3, 1986 [FR] France ................................ 86 09865

[51] Int. Cl.$^4$ ......................... C11D 7/36; C11D 7/08; C23F 4/04
[52] U.S. Cl. ........................................ 252/87; 134/41; 252/81; 252/82; 252/142; 252/174.24; 252/178; 252/181
[58] Field of Search ..................... 252/81, 82, 87, 142, 252/178, 174.24, 181; 134/41

[56] References Cited

U.S. PATENT DOCUMENTS

| | | | |
|---|---|---|---|
| 3,885,914 | 5/1975 | Hollingshad et al. | 422/17 |
| 4,209,398 | 6/1980 | Ii et al. | 252/181 |
| 4,530,955 | 7/1985 | Wilson et al. | 252/181 |

FOREIGN PATENT DOCUMENTS 2344498  3/1974  Fed. Rep. of Germany .
2544722  10/1984  France .
30642  3/1984  Hungary .

Primary Examiner—Robert Wax
Attorney, Agent, or Firm—Oblon, Fisher, Spivak, McClelland & Maier

[57] ABSTRACT

Acid compositions with high concentrations of active ingredients intended for the treatment of industrial or domestic waters and for cleaning the corresponding industrial or sanitary installations, comprising carboxylic polymer materials, a strong acid, possibly a salt of a divalent metal and possibly known specific agents, which comprise:

(a) from 10 to 60% by weight expressed in anhydrous form of a water-soluble carboxylic polymer in its acid form containing at least 5% by weight and preferably at least 10% by weight of itaconic acid,
(b) from 10 to 80% by weight expressed in anhydrous form of at least one strong acid,
(c) from 0 to 15% by weight expressed in anhydrous form of zinc in the form of $Zn^{2+}$ ions,
(d) from 0.1 to 10% by weight expressed in anhydrous form of specific agents,
(e) from 5 to 65% by weight of water.

These acid compositions with high concentrations have the property of inhibiting the scaling and corrosion of industrial and/or domestic installations and can be used for cleaning sanitary installations.

26 Claims, No Drawings

ACID COMPOSITION WITH HIGH CONCENTRATIONS OF ACTIVE MATERIALS FOR THE TREATMENT OF WATER AND/OR CLEANING INSTALLATIONS CONTAINING SAME

BACKGROUND OF THE INVENTION

1. Field of the Invention

The invention relates to acid compositions with a high content of active ingredients for the treatment of water and/or the descaling of installations comprising at least one water-soluble carboxylic polymer, at least one strong acid bascially of mineral origin, possibly at least one metallic salt of a bivalent cation and possibly specific agents such as corrosion inhibitors, biocide agents, perfumes, etc.

2. Discussion of the Background

For a long time the necessity of treating waters intended to supply industrial and/or domestic installations or waste in the form of aqueous effluents has been apparent to one skilled in the art.

Where natural waters and/or aqueous media are intended for industrial or domestic uses, they generally contain certain alkaline earth metals, solubilized in a saline form, such as calcium and magnesium. The compounds of these metals have the property of being insoluble and of becoming deposited in the form of mineral encrustations on the surfaces of the industrial or domestic installations which contain them, such as heat exchangers for heating (furnaces for production of hot water or steam), heat exchangers for cooling, steam turbines, steam pumps and condensers, evaporators, air conditioning units, heating circuits for individual or collective housing, sanitary installations in glazed earthenware.

Consequently, it has been shown to be necessary to prevent or to reduce to the maximum the formation of mineral encrustations on the surfaces of the industrial or domestic installations (in contact with the water) which are too often injurious, for example to the capacity of heat exchanges of the surfaces of heat exchangers or to the rate of flow of fluids so as to prevent or at least limit the risks of blocking the installations and to maintain them in good operating condition.

This is why the skilled artisan has already proposed aqueous compositions for the treatment of waters containing a low concentration of various well-known active agents, such as carboxylic copolymers with a low molecular weight, which agents slow the formation of scale resulting from the presence in the water of alkaline earth ions and which disperse the particles of clays, scale and metallic oxides which are present, and which also contain acids providing the regulation of the pH and assisting in dissolving of the scale formed, and finally also contain corrosion inhibitors, for example phosphoric acid, benzotriazole, intended to protect the metallic surfaces of the installations.

In this regard, a method has already been described (FR No. 2,231,778) for inhibiting the corrosion of metals in an aqueous medium consisting of maintaining in said medium a concentration of at least 5 ppm of a composition composed of zinc and at least one polymer with a molecular weight of between 500 and 10,000 selected from the group consisting of polyacrylamide, polyacrylic acid and sodium polyacrylate.

In the same vein, but for descaling and/or cleaning glazed earthenware sanitary installations, treatment compositions have been proposed (FR No. 2,469,450) which contain water-soluble polyacrylic acids, organic acids such as acetic, citric or lactic acids, a corrosion-inhibiting agent and, finally, additives such as perfumes, coloring agents and biocides.

Similarly, to limit the formation of scale and fight against the corrosion phenomena of industrial and/or domestic installations of a metallic type, the use (in an amount of at least 10 ppm) has been indicated (FR No. 2,231,778) of a composition comprising at least one water-soluble polymer having a molecular weight of between 500 and 10,000 and at least one corrosion-inhibiting agent such as phosphoric acid, benzotriazole, or mercaptobenzotriazole as well as a zinc salt.

However, all the acid compositions already recommended for the treatment of waters have a same major disadvantage in common which requires the skilled artisan to prepare and use them at low concentrations. Due to a certain incompatibility between the water-soluble polymer with the low molecular weight and the other agents included in the compositions intended for the treatment of the water, when compositions are prepared with a high concentration of active agents, an imbalance occurs in the shape of a precipitation which renders said compositions unsuitable for the use for which they are intended.

Therefore, since it has been shown to be impossible in use to prepare acid compositions with a high content of active ingredients for the treatment of water without causing the precipitation or at least the partial precipitation of said active ingredients, the skilled artisan has often carried out and still carries out either the simultaneous injection of concentrated solutions containing various active ingredients which are incompatible with one another at such concentrations or even the preparation and use of a diluted aqueous solution, that is with a low concentration of active ingredients. The first method has more disadvantages for the user than the second due to possible errors in the concentrations of active ingredients in the injected solutions and due to the regulation of the speeds of injection of said solutions.

Since then, applicant has shown (FR No. 2,544,722), by improved compositions for the treatment of water containing a carboxylic polymer and a zinc salt, the interest of replacing the acrylic acid polymer with an acrylic acid, methacrylic acid and an itaconic acid terpolymer having a substantially equivalent molecular weight. However, it has been noted during use that these terpolymers were also unsuitable for the preparation of acid compositions with a high content of active ingredients intended for the treatment of waters such as, for example, those containing high concentrations of said terpolymer, a zinc salt and a strong acid such as phosphoric acid or the phosphonic acids and, in addition, other specific agents, because they precipitate when they are incorporated into a medium which has a high concentration of strong acid.

Faced with the economic necessity and the technical requirement of having acid compositions with high concentrations of active ingredients intended for the treatment of industrial or domestic waters and for the cleaning of the corresponding industrial or sanitary installations, applicant, by continuing his research, found and perfected such compositions.

SUMMARY OF THE INVENTION

In accordance with the invention, the acid compositions with high concentrations of active ingredients, comprising at least one carboxylic polymer, at least one strong acid, possibly at least one salt of a divalent metal and possibly known specific agents, are characterized in that said compositions comprise:

(a) from 10 to 60% by weight expressed in anhydrous form of a water-soluble carboxylic polymer in its acid form containing at least 5% by weight and preferably at least 10% by weight of itaconic acid, (b) from 10 to 80% by weight expressed in anhydrous form of at least one strong acid, (c) from 0 to 15% by weight expressed in anhydrous form of zinc in the form of $Zn^{2+}$ ions, (d) from 0 to 10% by weight expressed in anhydrous form of specific agents, (e) from 0 to 65% by weight of water.

The water-soluble carboxylic polymers used in the acid compositions in accordance with the invention are formed from acrylic acid and from 5 to 90% by weight, but preferably from 10 to 60% by weight, of itaconic acid.

DETAILED DESCRIPTION OF THE PREFERRED EMBODIMENTS

In accordance with one alternative, the water-soluble carboxylic polymers can contain a small amount of methacrylic acid. In this case, said polymers can contain from 0.05 to 10% by weight, but preferably from 0.1 to 5% by weight, of methacrylic acid, from 10 to 95% by weight, but preferably from 60 to 90% by weight, of acrylic acid, and from 5 to 90% by weight, but preferably from 10 to 60% by weight, of itaconic acid.

These carboxylic polymers are prepared in accordance with known methods in aqueous media and/or solvents (such as alcohols) by radical copolymerization of the acrylic, itaconic and possibly methacrylic acids in the presence of polymerization regulators such as, for example, organic compounds based on hydroxylamine, mercaptans or thioglycolic acid, and in the presence of known polymerization initiators such as peroxides and per salts, for example hydrogen peroxide, persulfate, etc., and then by possibly carrying out a total or partial neutralization of the polymerizate.

At the end of polymerization and after having removed the alcohol solvent, when such has been used, the aqueous solution of the polymerizate obtained can be used, preferably in acid form, or can possibly be partially or fully neutralized by at least one suitable neutralizing agent having a monovalent function or a polyvalent function.

The aqueous solution of the polymerizate can also be treated by any method known to one skilled in the art in order to remove the liquid phase and isolate the carboxylic copolymers in the form of a fine powder which can be used in this other form.

The water-soluble carboxylic polymers used in the compositions in accordance with the invention are those in which the sodium salts have a specific viscosity of between 0.25 and 2, and preferably between 0.30 and 0.80.

The determination of the specified viscosity of said polymers, symbolized by the Greek letter $\eta_{spe}$, can be carried out in the following manner:

A polymer solution is prepared in the form of a sodium salt by dissolving 50 g of the dry terpolymer in one liter of a solution of distilled water containing 60 g of sodium chloride. Then, using a capillary viscosimeter placed in a bath thermostatted to 25° C., the flow time is measured of a given volume of the above-identified solution containing the alkaline acrylic terpolymer as well as the flow time of the same volume of an aqueous solution of sodium chloride not containing said terpolymer. It is then possible to define the specific viscosity $\eta_{spe}$ using the following equation:

$$\eta_{spe} = \frac{\text{(flow time of the polymer solution)} - \text{(flow time of the NACl solution)}}{\text{(flow time of the NaCl solution)}}$$

The capillary tube is generally selected in such a manner that the flow time of the NaCl solution not containing any terpolymer is approximately 90 to 100 seconds, thus giving very accurate specific viscosity measurements.

With regard to the strong acid used in the compositions in accordance with the invention, it can be selected from among the phosphoric, phosphonic, hydrochloric, sulfuric and sulfamic acids, but preferably from among the phosphoric and hydrochloric acids.

The zinc possibly used in the acid compositions in accordance with the invention can be introduced in the form of a water-soluble zinc salt such as, preferably, zinc chloride, zinc fluoride, zinc sulfate, zinc nitrate, zinc phosphate or zinc acetate.

The acid compositions in accordance with the invention can also contain well-known specific agents, such as biocide agents and perfumes, and also compounds such as benzotriazole in variable amounts.

The acid compositions in accordance with the invention with high concentrations of active ingredients intended for the treatment of industrial or domestic waters and for the cleaning of the corresponding industrial or sanitary installations comprising at least one carboxylic polymer, at least one strong acid, possibly a salt of a divalent metal and possibly known specific agents are characterized in that said compositions preferably contain:

(a) from 10 to 35% by weight expressed in anhydrous form of a water-soluble carboxylic polymer in its acid form containing at least 5% by weight and preferably at least 10% by weight of itaconic acid, (b) from 15 to 60% by weight expressed in anhydrous form of at least one strong acid, (c) from 2 to 8% by weight expressed in anhydrous form of zinc in the form of $Zn^{2+}$ ions, (d) from 0.5 to 5% by weight expressed in anhydrous form of specific agents, (e) from 25 to 60% by weight of water.

The acid compositions in accordance with the invention are aqueous solutions which are clear, homogeneous and stable during prolonged stocking. They inhibit scaling and metal corrosion in a remarkable manner when they are maintained, in the aqueous medium in question, at a concentration of at least 1 ppm expressed in anhydrous form, and preferably from 2 to 1,000 ppm depending on the aggressivity of the medium to be treated. However, the acid compositions in accordance with the invention can be used at higher concentrations in the cleaning of sanitary installations.

The scope and interest of the invention will be more fully appreciated from the following examples:

EXAMPLE 1

Using the known radical polymerization technique already mentioned, carboxylic polymers having different proportions of acrylic, itaconic and possibly methacrylic acids were prepared. These polymers are listed in Table I under the numbers 1 to 9.

To do this and for the purpose of illustrating the polymerization method, polymer No. 5 was prepared by carrying out the following protocol, it being understood that the other polymers were prepared using the same protocol and adapting for each of them the system composed of catalysts and transfer agents in order to adjust their specific viscosity.

The following ingredients were placed in an autoclave:

| | |
|---|---|
| water | 1,268.00 kg |
| copper acetate | 1.20 kg |
| acrylic acid at 90% | 6.40 kg |
| isopropanol | 600.00 kg |

These ingredients were heated to a temperature of 80° C.–90° C.

Then, over a period of approximately 3 hours and while maintaining the temperature in the above-identified range, a charge was added which was composed of:

| | |
|---|---|
| water | 1,683.20 kg |
| mixtures of carboxylic acids | 1,630.00 kg |
| hydrazine hydrate at 24% | 20.00 kg |

At the same time as the charge, a polymerization catalyst was also introduced which was composed of:

| | |
|---|---|
| water | 362.20 kg |
| 130 volumes hydrogen peroxide | 362.30 kg |

After the addition of the charge and the catalyst, the isopropanol was distilled at a temperature of 100° C. until completely eliminated.

Finally, after having cooled the resulting medium to a temperature of 20° C., the solution containing the copolymer was adjusted to a final concentration of 50% by weight of dry material.

TABLE 1

| Polymer No. | 1 | 2 | 3 | 4 | 5 | 6 | 7 | 8 | 9 |
|---|---|---|---|---|---|---|---|---|---|
| PA or INV | PA | PA | INV | INV | INV | INV | INV | INV | INV |
| Acrylic acid | 100 | 45 | 95 | 85 | 75 | 61 | 60 | 50 | 66 |
| Itaconic acid | | 15 | 5 | 15 | 25 | 30 | 40 | 50 | 30 |
| Methacrylic acid | | 40 | 0 | 0 | 0 | 9 | 0 | 0 | 4 |
| "$\eta spe$" | 0.38 | 0.32 | 0.30 | 0.30 | 0.38 | 0.38 | 0.65 | 0.31 | 0.42 |

PA = Prior Art
INV = Invention

EXAMPLE 2

The object of this example is to show the good action of the polymers used in accordance with the invention when acid compositions are prepared containing high concentrations of said polymers with concentrated phosphoric acid.

The tests carried out for this purpose were conducted by comparison with the prior art polymers.

For this purpose, the 50% solutions of carboxylic polymers were mixed with 75% phosphoric acid under the following conditions:

(a) Composition:

| | |
|---|---|
| 50% polymer solution | 50 grams |
| 75% phosphoric acid | 50 grams |

(b) Method:

The mixture was carried out in a beaker at an ambient temperature of 20° C. using a magnetic stirrer. The stirring time was 5 minutes.

The results obtained are summarized in Table II below.

TABLE II

| | POLYMER TABLE I | | APPEARANCE OF THE MIXTURE | | |
|---|---|---|---|---|---|
| | No. | PA or INV | Immediate | After 24 hours | After 1 month |
| Test 1 | 1 | PA | Cloudy and viscous | Cloudy and viscous | Cloudy, separation in 2 phases |
| Test 2 | 2 | PA | Cloudy | Cloudy, viscous, 2 phases | Cloudy, viscous, 2 phases |
| Test 3 | 3 | INV | Clear | Cloudy | Cloudy, separation in 2 phases |
| Test 4 | 4 | INV | Clear | Cloudy | Cloudy, separation in 2 phases |
| Test 5 | 5 | INV | Clear | Clear | Clear |
| Test 6 | 6 | INV | Clear | Clear | Slightly cloudy |
| Test 7 | 8 | INV | Clear | Clear | Clear |
| Test 8 | 8 | INV | Clear | Clear | Clear |
| Test 9 | 8 | INV | Clear | Clear | Clear |

Tests 1 and 2 show that the prior art polymers after the addition of phosphoric acid have a development in their physical state which renders impossible the use of the composition.

On the other hand, tests 3 to 9 show the good action of the compositions in accordance with the invention containing said polymers and phosphoric acid, which compositions remain clear for several hours or for more than depending on the ratio of the monomers.

EXAMPLE 3

This example is intended to show the good action of the polymers in accordance with the invention when they are used in complex acid compositions in accordance with the invention which contain zinc chloride, phosphoric acid and benzotriazole.

For this purpose, mixtures were prepared under the following conditions:

(a) Composition:

| | |
|---|---|
| 50% aqueous polymer solution | 41.68 grams |

-continued

| ZnCl₂ in 55% aqueous solution | 13.34 grams |
| water | 19.58 grams |
| benzotriazole | 0.40 gram |
| 75% phosphoric acid | 25.00 grams |

(b) Method

The 50% polymer solution was poured first into a beaker provided with a magnetic stirrer, then were added the 55% zinc chloride solution, the water and finally the phosphoric acid in which the benzotriazole had previously been dissolved.

The method was carried out at an ambient temperature of 20° C. for 5 minutes.

The results obtained are summarized in Table III below.

TABLE II

| | POLYMER TABLE I | | APPEARANCE OF THE MIXTURE | |
|---|---|---|---|---|
| | No. | PA or INV | IMME-DIATE | AFTER 24 HOURS | AFTER 1 MONTH |
| Test 10 | 1 | PA | Opalescent | Cloudy | 2 phases |
| Test 11 | 2 | PA | Cloudy | 2 phases | 2 phases |
| Test 12 | 5 | INV | Clear | Clear | Clear, formation of 1 almost imperceptible deposit |

Here again, test 12 clearly shows the good action of the acid composition in accordance with the invention in relation to the prior art compositions which are cloudy and unusable.

EXAMPLE 4

This example which is similar to Example 3 is intended to show the polyvalence of the acid compositions in accordance with the invention when the phosphoric acid is replaced by another acid, for example hydrochloric acid.

For this purpose, mixtures were prepared under the following conditions:

(a) Composition:

| 50% aqueous polymer solution | 50.00 grams |
| ZnCl₂ in 55% aqueous solution | 13.34 grams |
| benzotriazole | 2.00 grams |
| 35% hydrochloric acid | 34.66 grams |

The 50% polymer solution was poured first into a beaker provided with a magnetic stirrer, then were added the 55% zinc chloride solution, the water and finally the hydrochloric acid in which the benzotriazole had previously been dissolved.

The method was carried out at an ambient temperature of 20° C. for 5 minutes.

The results obtained are summarized in Table IV below.

TABLE IV

| | POLYMER TABLE I | | APPEARANCE OF THE MIXTURE | | |
|---|---|---|---|---|---|
| | No. | PA or INV | IMME-DIATE | AFTER 24 HOURS | AFTER 1 MONTH |
| Test 13 | 1 | PA | Opalescent | Cloudy | Separation in 2 phases |
| Test 14 | 5 | INV | Clear | Clear | Clear |

Therefore, test 14 confirms the good action of the complex acid composition in accordance with the invention which has been strongly acidified with hydrochloric acid, while test 13, which was carried out with a prior art acid composition, is cloudy and unusable.

We claim:

1. A composition intended for the treatment of industrial or domestic water and for cleaning the corresponding industrial or sanitary installations, comprising:
   (A) from 10 to 60% by weight, expressed in anhydrous form, of a water-soluble carboxylic polymer in its acid form containing at least 5% by weight of itaconic acid and not more than 10% by weight of methacrylic acid;
   (B) from 10 to 80% by weight, expressed in anhydrous form, of at least one strong acid which is at least one member selected from the group consisting of phosphoric acid, phosphonic acid, hydrochloric acid, sulfuric acid and sulfamic acid,
   (C) from 0 to 15% by weight, expressed in anhydrous form, of zinc in the form of $Zn^+$ ions,
   (D) from 0.1 to 10% by weight, expressed in anhydrous form, of a specific agent, wherein said specific agent is at least one member selected from the group consisting of biocide agents, perfumes, and corrosion inhibitors; and
   (E) from 0 to 65% by weight of water.

2. The composition of claim 1, wherein said water-soluble carboxylic polymer in its acid form contains at least 10% by weight of itaconic acid.

3. The composition of claim 1, comprising:
   (A) from 10 to 30% by weight, expressed in anyhdrous form, of said water-soluble carboxylic polymer in its acid form containing at least 5% by weight of itaconic acid;
   (B) from 15 to 60% by weight, expressed in anhydrous form, of said strong acid;
   (C) from 2 to 8% by weight, expressed in anhydrous form, of said zinc;
   (D) from 0.5 to 5% by weight, expressed in anhydrous form, of said specific agent; and
   (E) from 25 to 60% by weight of water.

4. The composition of claim 2, comprising:
   (A) from 10 to 35% by weight, expressed in anhydrous form, of a water-soluble carboxylic polymer in its acid form containing at least 10% by weight of a itaconic acid;
   (B) from 15 to 60% by weight, expressed in anhydrous form, of said strong acid;
   (C) from 2 to 8% by weight, expressed in anhydrous form, of said zinc;
   (D) from 0.5 to 5% by weight, expressed in anhydrous form, of said specific agent; and
   (E) from 25 to 60% by weight of water.

5. The composition of claim 1, wherein said water-soluble carboxylic polymer is formed from acrylic acid and from 5 to 90% by weight of itaconic acid.

6. The composition of claim 1, wherein said water-soluble carboxylic polymer is formed from acrylic acid and from 10 to 60% by weight of itaconic acid.

7. The composition of claim 1, wherein said water-soluble carboxylic polymer is formed from 0.05 to 10% by weight of methacrylic acid, from 10 to 95% by weight of acrylic acid, and from 5 to 90% by weight of itaconic acid.

8. The composition of claim 1, wherein said water-soluble carboxylic polymer is formed from 0.1 to 5% by weight of methacrylic acid, from 60 to 90% by weight of acrylic acid, and from 10 to 60% by weight of itaconic acid.

9. The composition of claim 1, wherein said water-soluble carboxylic polymer is partially neutralized.

10. The composition of claim 1, wherein said water-soluble carboxylic polymer has a specific viscosity, in its sodium salt form, of between 0.25 and 2.

11. The composition of claim 1, wherein said water-soluble carboxylic polymer has a specific viscosity, in its sodium salt form, of between 0.30 and 0.80.

12. The composition of claim 1, wherein said strong acid comprises phosphoric acid.

13. The composition of claim 1, wherein said strong acid comprises phosphonic acid.

14. The composition of claim 1, wherein said strong acid comprises hydrochloric acid.

15. The composition of claim 1, wherein said strong acid comprises sulfuric acid.

16. The composition of claim 1, wherein said strong acid comprises sulfamic acid.

17. The composition of claim 1, wherein said zinc comprises zinc chloride.

18. The composition of claim 1, wherein said zinc comprises zinc fluoride.

19. The composition of claim 1, wherein said zinc comprises zinc sulfate.

20. The composition of claim 1, wherein said zinc comprises zinc nitrate.

21. The composition of claim 1, wherein said zinc comprises zinc phosphate.

22. The composition of claim 1, wherein said zinc comprises zinc acetate.

23. The composition of claim 1, wherein said specific agent comprises a biocide agent.

24. The composition of claim 1, wherein said specific agent comprises a perfume.

25. The composition of claim 1, wherein said specific agent comprises a corrosion inhibitor.

26. The composition of claim 25, wherein said corrosion inhibitor comprises benzotriazole.

* * * * *